United States Patent [19]
Schmitt et al.

[11] 3,960,991
[45] June 1, 1976

[54] ROTARY AERATOR

[75] Inventors: Walti Schmitt, Wiesbaden-Biebrich; Philipp Kreiner, Taunusstein-Hahn, both of Germany

[73] Assignee: Passavant-Werke Michelbacher Hutte, Germany

[22] Filed: June 3, 1974

[21] Appl. No.: 475,953

[30] Foreign Application Priority Data
July 25, 1973   Germany............................ 2337804

[52] U.S. Cl. .............................. 261/92; 416/198 A; 416/212 R
[51] Int. Cl.² ........................ F24F 5/00; B05B 3/12
[58] Field of Search .......... 261/92; 416/198 A, 201, 416/200, 208, 178, 207, 198, 212; 415/214, 143; 172/554, 122

[56] References Cited
UNITED STATES PATENTS

| 241,278 | 5/1881 | Barnard | 416/198 |
|---|---|---|---|
| 740,945 | 10/1903 | Taplin | 416/198 A |
| 1,107,238 | 8/1914 | Kieser | 416/198 A |
| 1,363,660 | 12/1920 | La Fleur | 416/200 |
| 1,551,402 | 8/1925 | Junggren | 416/198 A |
| 2,996,280 | 8/1961 | Wilson | 416/198 A |
| 3,188,007 | 6/1965 | Myklebust | 261/91 |
| 3,255,515 | 6/1966 | Clarke | 416/198 A |
| 3,295,682 | 1/1967 | Schramm | 261/92 |
| 3,458,176 | 7/1969 | Auler | 261/92 |
| 3,554,668 | 1/1971 | Wagle | 416/198 |
| 3,596,709 | 8/1971 | Dravnieks | 261/92 |

Primary Examiner—Tim R. Miles
Assistant Examiner—Gregory N. Clements
Attorney, Agent, or Firm—Woodford R. Thompson, Jr.

[57] ABSTRACT

A rotary aerator is mounted for rotation about a horizontal axis and has a plurality of agitator elements formed integrally with hub segments to provide generally star-shaped members which extend radially from the circumference of the aerator along the length thereof for introducing air or other gases into waste water or other fluids.

16 Claims, 7 Drawing Figures

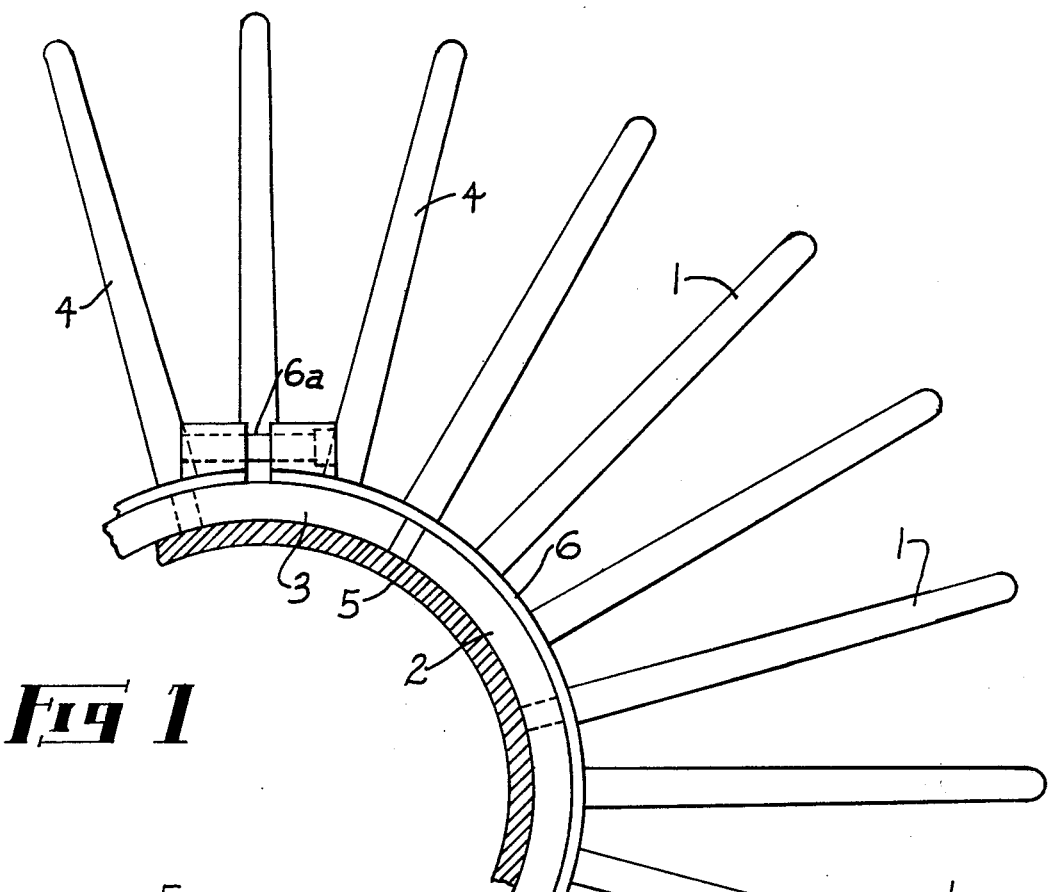
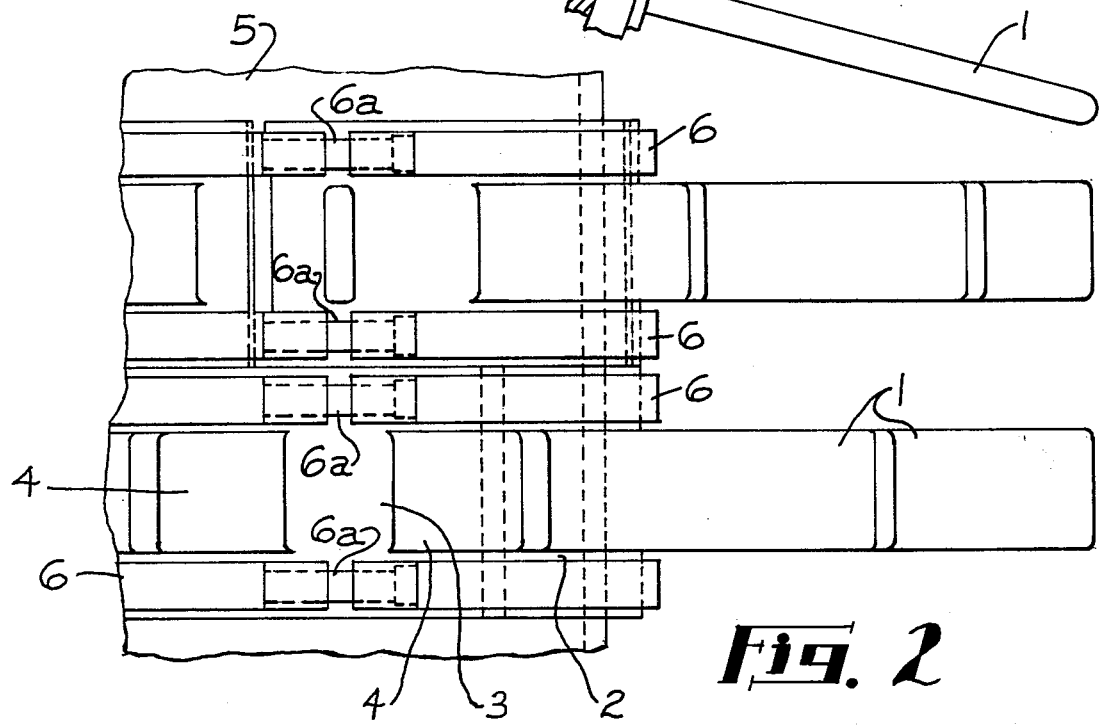

ROTARY AERATOR

BACKGROUND OF THE INVENTION

This invention relates to a rotary aerator having a rotor mounted for rotation about a horizontal axis for the introduction of air or other gases into waste water or similar fluids by a plurality of agitator elements formed integrally with hub portions assembled to provide generally star-shaped members which extend radially from the circumference of the rotor along the entire length thereof.

In prior art equipment such as that described in German patent No. 1 135 835 the agitating means has consisted of metal blades having their roots or surfaces lying between blades extending in a circumferential direction and bolted together to form star-shaped members which are rigidly connected to a rotor shaft by retaining means.

Depending upon the liquid in which it operates, the rotor is more or less exposed to the effects of corrosion, in particular if waste water is being treated. Furthermore, the transition between the metal blades and the root portion lying between adjacent blades defines a narrow bending radius which reduces the bending fatigue strength of the rotor.

In accordance with our present invention we eliminate the above-mentioned disadvantages by providing a rotor having agitator elements formed integrally with a hub portion with the integrally formed members being of a corrosion resistant synthetic plastic material whereby the bending fatigue strength of the rotor is not reduced and an increased corrosion resistance is provided. Also, the weight of the rotor unit is decreased whereby the need for heavy supports is reduced and the cost of production is greatly reduced. The agitator elements of the rotor are assembled in groups of several elements molded integrally with a common hub part or segment so as to provide an integral unit formed of synthetic plastic material. Preferably, the hub portions are molded to provide segments of a cylindrical sleeve-like member.

Since the agitator elements and their respective hub parts form integrally molded plastic members, the transition between root portions and adjacent blade and hub parts no longer poses any problems. The agitator elements are molded integrally with their respective segmental hub parts and are disposed in a plane extending transversely of the rotor unit. Due to slippage or the creep behavior of synthetic plastic material it is usually very difficult to transfer major forces from a plastic member to a rotary member. In accordance with our present invention forces are transferred from the hub to the shaft and the slippage problem is solved by positively interconnecting the adjoining agitator elements so as to prevent them from shifting relative to one another. At least a part of the torque is thus directly transmitted from one agitator element to the next.

To achieve this, adjacent vertical faces of the hub parts of adjoining rotor elements are in frictional contact with each other. In another embodiment, the adjacent vertical faces of the hub parts are provided with projections and recesses for positive engagement with each other in a circumferential direction and, if required, also in a radial direction. The projections and recesses may be of various shapes, such as rectangular or round teeth or pins which engage holes.

Preferably, each recess is staggered relative to the projection at the opposite side of the same hub part in a circumferential direction relative to the pitch of the agitator elements, the displacement being a fraction of the angular distance between adjacent agitator elements. Due to this arrangement, only a limited number of agitator elements will simultaneously dip into the water, which results in improved operational conditions for the unit. That is, the mounting and assembly according to our invention permits a transfer of at least a part of the temporary local peak load directly from one agitator element to the adjacent agitator element.

The hub parts may be fitted with their interior surfaces on a shaft, preferably a hollow shaft, so as to be in frictional contact therewith. The shaft supporting the agitator elements may be relieved of at least part of its load due to the direct transfer of forces between the individual agitator elements. If the hub parts have projections and recesses formed thereon, as described above, no other direct axial contact of adjacent agitator elements is required and the projections do not have to fit tightly into their associated recesses. The agitator elements may be spaced a predetermined distance from each other, so that the deformation of the shaft is limited to certain sections. Another important feature of our shaft-type rotor is that the individual agitator elements and their respective hub parts may be easily dismantled and replaced.

According to our invention, the hub parts may be secured to the shaft and/or to one another by any suitable means. However, it is preferable to fasten the hub parts on the shaft by means of clamping straps, so as not to weaken the shaft by welding or providing holes therethrough, particularly where hollow shafts are employed. Furthermore, our design facilitates mounting and replacement of agitator elements.

A further embodiment of our invention completely eliminates the shaft as a supporting means for the agitator elements. In this embodiment the hub parts together with axially extending clamps form a substantially rigid unit, which also increases the corrosion resistance of the unit considerably and further decreases its weight. The hub parts are thus assembled to form a hollow shaft and may be connected by means of axially extending tie rods or the like which are preferably positioned inside the hollow shaft whereby they are protected against corrosion.

The tie rods are connected to transverse end plates. In addition, the tie rods may extend through and be supported in openings provided in bosses of hub parts or provided in additional rings or disks, with the openings being arranged circumferentially in a transverse plane. This arrangement adds to the stability of the unit since the additional rings or disks may be similar in shape and structure to the hub parts and do not carry agitator elements. They may, however, be narrower than the hub parts.

In another embodiment the axially adjoining, vertical faces of the hub parts are formed to receive pressure absorbing members therein which when assembled are in contact with one another. These members relieve the load on the plastic material and the creeping tendency of the plastic material may be overcome by providing interlocking projections and recesses at opposite ends of the pressure absorbing members. The pressure absorbing members preferably extend over the entire axial length of the rotor whereby extremely high forces may be applied.

DESCRIPTION OF THE DRAWINGS

Apparatus embodying features of our invention is illustrated in the accompanying drawings forming a part of this application, in which:

FIG. 1 is a fragmental sectional view through a rotor unit employed for the aeration of waste water;

FIG. 2 is a fragmental plan view of the rotor unit shown in FIG. 1;

DETAILED DESCRIPTION

Figure 2A:
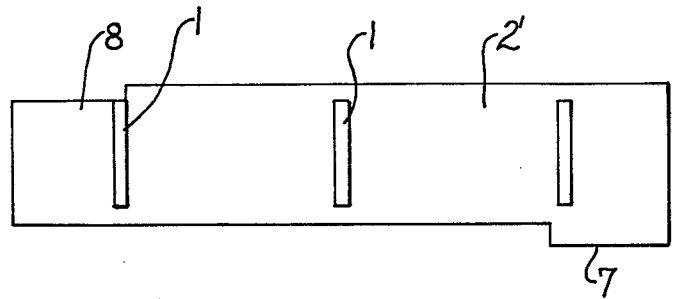
FIG. 2a is a developed view showing the outer surface of a single hub part or segment flattened out and showing a slightly modified form of our invention.

Referring now to the drawings, we show in FIGS. 1 and 2 three agitator elements 1 in the form of blades or bar-shaped aerating vanes each of which is molded integrally with a common hub part 2 which is a segment of a cylindrical sleeve. The rotor unit consists of a plurality of the agitator elements and their respective hub parts or segments which are made of a suitable synthetic plastic material. That is, adjoining the hub part or segment 2 in a circumferential direction is an identical hub part or segment 3 having agitator elements 4. The entire circumference of the rotor unit is thus covered with hub segments 2 and 3 and their agitator elements 1 and 4 respectively. The agitator elements 1 and 4 may be in the form of blades, bars or the like and in operation they are at least partly submerged in the fluid to be aerated so as to introduce the gas into the fluid whereby their rigidity, shape and velocity cause the formation of air entraining eddies.

Each annular row of hub segments 2 and 3 and their respective agitator elements 1 and 4 define a generally star-shaped agitator assembly. Each annular row of hub parts or segments are fastened to a hollow shaft 5 by means of clamping straps 6 and suitable retaining bolts 6a.

As shown in FIGS. 1 and 2, a plurality of agitator elements 1 and 4 are disposed in parallel vertical planes extending transversely of the axis of the rotor unit and are molded integrally with the hub segments 2 and 3. The axially adjoining star-shaped assemblies are shown as being assembled with adjacent hub parts or segments staggered relative to each other and are arranged to cover the entire length of the hollow shaft 5. If desired, the arrangement may be such that several axially adjoining hub segments carrying the agitator elements 1 and 4 may be formed integrally as one common hub part.

Figure 2B:
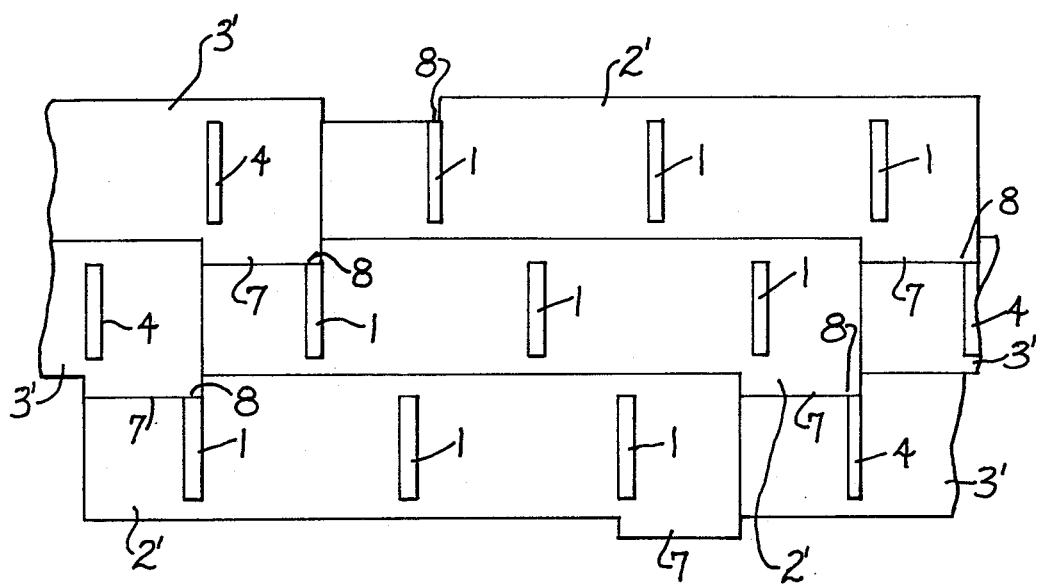
FIG. 2b is a fragmental, developed view showing several hub parts or segments according to FIG. 2a in assembled relation to each other.

In FIGS. 1 and 2 we show the vertical faces of the hub parts of segments 2 and 3 as being smooth, continuous surfaces with torque forces being transmitted by frictional engagement of adjacent surfaces. We show a modified form of our invention in FIG. 2a, which is a developed view showing the outer surface of a hub part 2', wherein each hub part has a boss or projection 7 on one side, and a recess 8 on the opposite side. FIG. 2b is a developed view showing the assembly of hub parts 2' and 3' of three adjoining star-shaped assemblies. As the projections of one star-shaped assembly engage the recesses of the adjoining star-shaped assembly, a positive connection is provided between adjoining star-shaped assemblies. It should be noted that the hub parts or segments may engage each other with a predetermined clearance which compensates for any deformation in the surface of the hollow shaft 5.

An important feature of the design shown in FIGS. 2a and 2b is that forces are, at least to a certain extent, transferred directly between the adjacent star-shaped assemblies. Accordingly, it is possible to mold the agitator elements 1 and 4 and their hub parts or segments of corrosion-resistant, synthetic plastic material without reducing the stability of the unit.

As shown in FIG. 2b the projections 7 on one hub part or segment is staggered relative to the projection 7 on the hub part adjacent thereto. Accordingly, there is an angular displacement between adjacent hub parts of adjoining star-shaped assemblies which is substantially one-half of the angular pitch of the agitator elements 1 and 4. Accordingly, the agitator elements 1 and 4 of adjoining star-shaped assemblies are not disposed in the same axial plane. This results in a helical formation of the agitator elements 1 and 4 whereby the agitator elements of adjoining star-shaped assemblies are angularly spaced a small distance relative to each other, so as to strike the water or other fluid in rapid succession.

Figure 3:
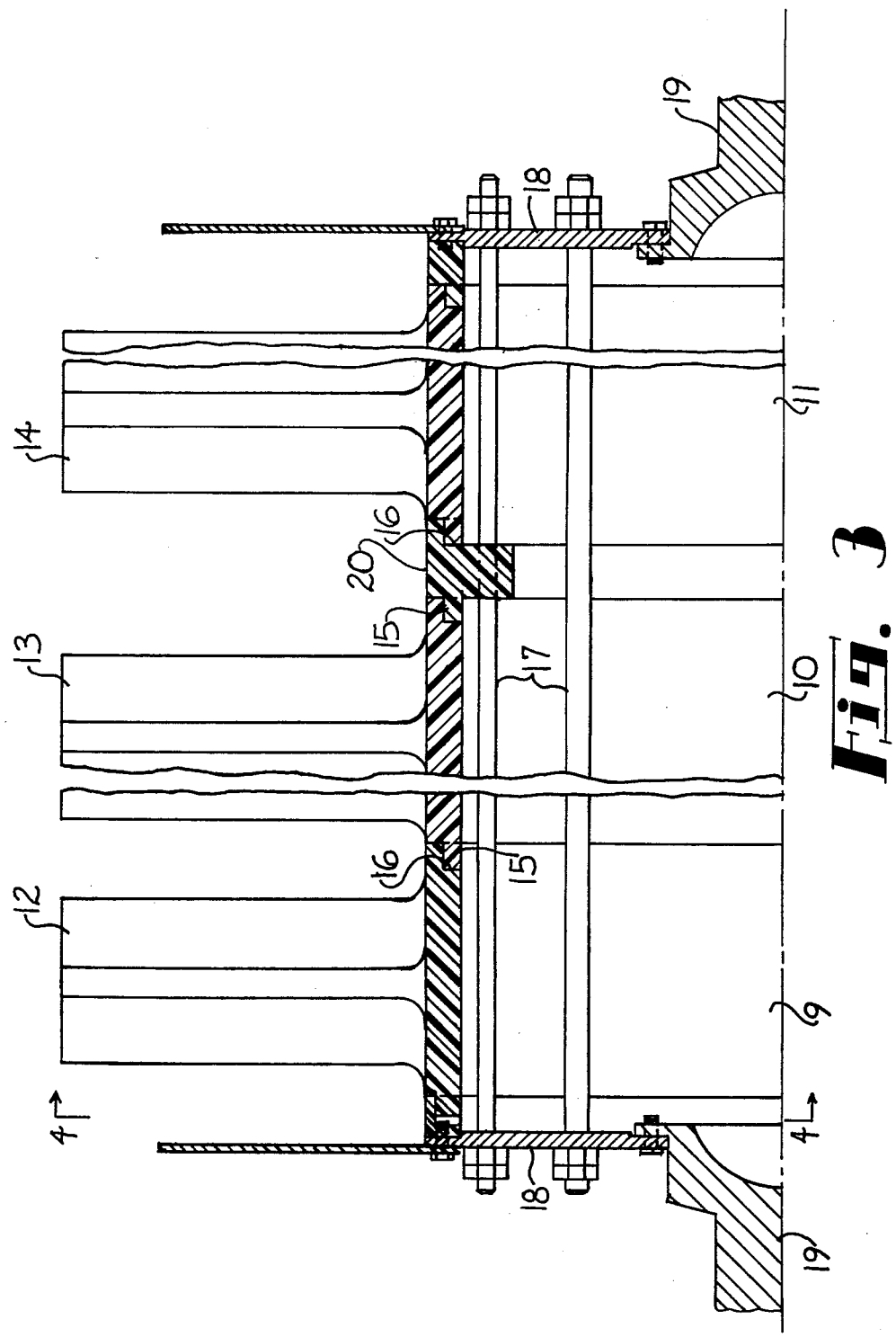
FIG. 3 is a fragmental, longitudinal sectional view through another embodiment of our invention.

In the embodiment shown in FIG. 3, the hub parts are assembled to form a continuous hollow shaft, thus eliminating the necessity of providing a supporting shaft, such as shaft 5. In FIG. 3 we show three synthetic plastic hub parts or segments 9, 10 and 11, having agitator elements 12, 13 and 14 molded integrally therewith. The hub parts are provided with bosses or projections 15 which engage corresponding recesses 16 formed in adjacent hub parts. Accordingly, the hub parts interlock circumferentially as well as axially. The hub parts 9, 10 and 11 are held together by angularly spaced tie rods 17 disposed in the interior of the hollow shaft member defined by the assembled hub parts so as to be protected against corrosion. The tie rods 17 extend through and are connected to end plates 18 which in turn are connected to stub shafts 19. Interposed between all or certain ones of the hub parts 9, 10 and 11 are rings 20 which receive all or certain ones of the tie rods 17. The rings 20 are also provided with projections 15 and recesses 16 but have no agitator elements formed thereon. Instead of employing the rings 20, the hub parts 9, 10 and 11 may be provided with additional bosses having openings therethrough for receiving and supporting the tie rods 17.

Figure 4:
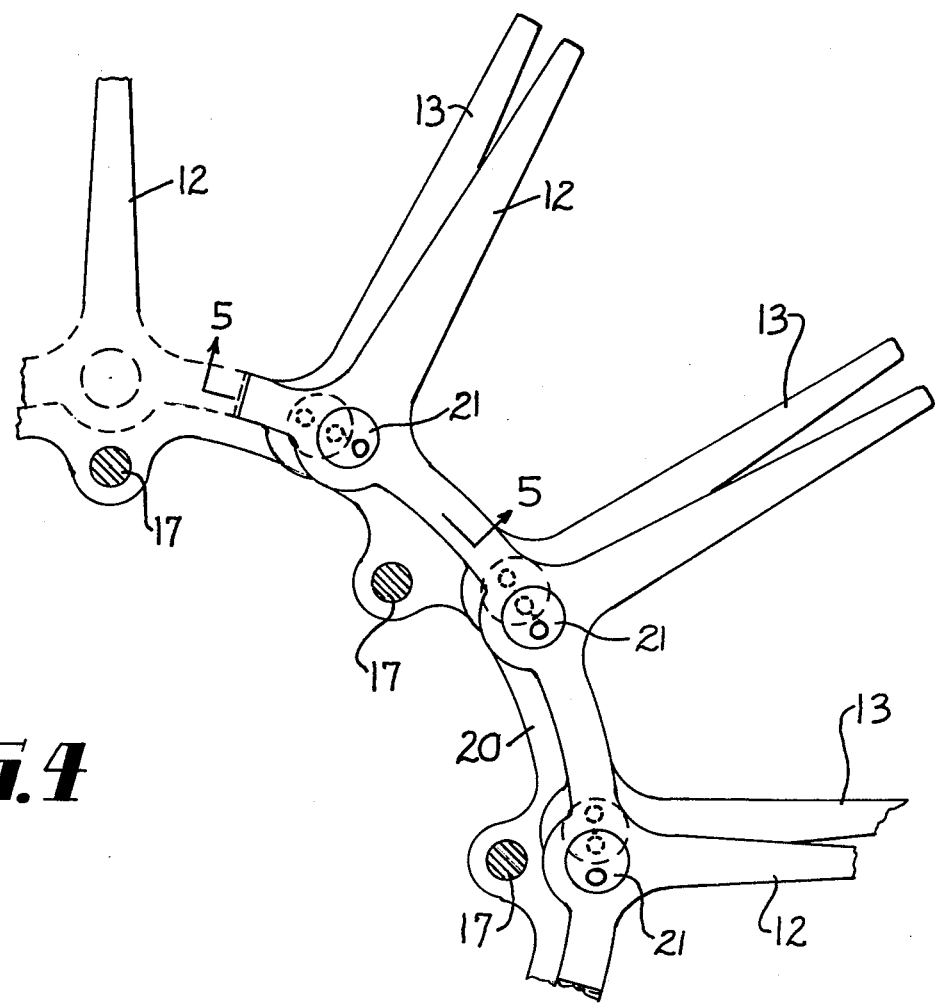
FIG. 4 is a fragmental, sectional view taken generally along the line 4—4 of FIG. 3; and, FIG. 5 is a sectional view taken generally along line 5—5 of FIG. 4.
Figure 5:
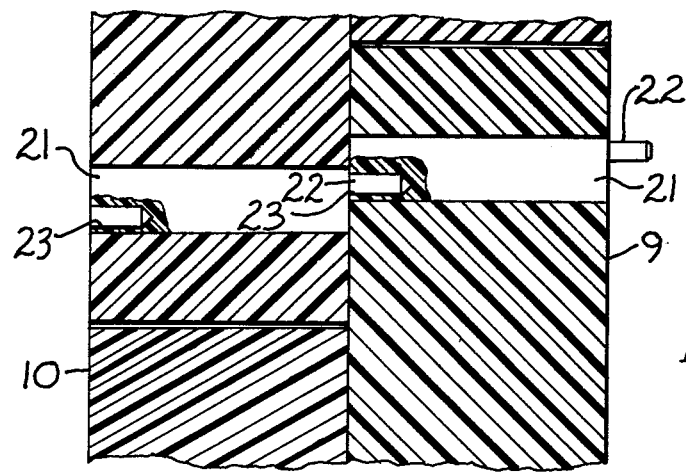

As shown in FIG. 4, axially extending pressure absorbing members 21 formed of a suitable resistant material, such as steel pins, are provided in the hub parts. These members increase the stability of the unit so that it may be subjected to considerable compressive forces. As shown in FIGS. 4 and 5, the members 21 provide a continuous chain of contact through the unit; and being completely embedded in the hub parts 9, 10 and 11, the members 21 are protected against corrosion. The pressure absorbing members 21 are provided with bosses or projections 22 and recesses 23 at opposite ends thereof, with the projections 22 of each hub part engaging recesses 23 in an adjacent hub part, as shown. The interlocking projections and recesses may be provided in addition to the projections 15 and recesses 16 shown in FIG. 3 or may replace the latter. The bosses or projections 22 and recesses 23 are staggered relative to each other to provide a helical arrangement as shown. FIG. 4 shows clearly the integral molding of the plastic material at the transition points where the roots of the agitator elements merge with their respective hub parts.

While we have shown our invention in several forms, it will be obvious to those skilled in the art that it is not so limited, but is susceptible of various other changes and modifications without departing from the spirit thereof.

What I claim is:

1. An elongated horizontal rotor for introducing gases into fluids comprising:
    a. a plurality of axially arranged hub members mounted in close sequence along the axial length of the rotor and extending transversely of the axis of rotation of the rotor and being formed of a synthetic plastic material with each hub member comprising segments of a cylindrical sleeve-like member connected to each other,
    b. a plurality of radially extending, synthetic plastic agitator elements molded integrally with each said hub member to form an integral star-shaped unit,
    c. means detachably interlocking adjacent vertical faces of said hub members to each other, and
    d. clamping means detachably connecting said hub members to said rotor.

2. A rotor as defined in claim 1 in which said agitator elements molded integrally with each said hub member extend in a common plane which extends transversely of said axis of rotation of the rotor.

3. A rotor as defined in claim 1 in which the inner surfaces of said hub members are in frictional engagement with and are supported by a shaft-like member.

4. A rotor as defined in claim 1 in which said hub members are connected to said rotor by clamping straps.

5. A rotor as defined in claim 1 in which said adjacent faces of said hub members are interconnected by projections and recesses carried by adjacent hub members.

6. A rotor as defined in claim 5 in which said recesses and projections on the same hub member are staggered relative to each other in a circumferential direction.

7. A rotor as defined in claim 1 in which the means interlocking adjacent vertical faces of said hub members to each other comprises pressure absorbing members extend through adjacent hub members and the adjacent vertical faces thereof in position for the adjacent ends thereof to contact each other.

8. A rotor as defined in claim 7 in which one of said adjacent ends is provided with a projection which engages a recess in the other of said adjacent ends.

9. A rotor as defined in claim 7 in which there is a continuous chain of contact between said pressure absorbing members throughout the entire axial length of the assembled hub members.

10. A rotor as defined in claim 1 in which said hub members are secured to each other by axially extending clamping means to provide a rigid unit.

11. A rotor as defined in claim 10 in which said hub members secured to each other form a hollow shaft.

12. A rotor as defined in claim 10 in which said hub members are held in place by axially extending tie rods.

13. A rotor as defined in claim 12 in which said tie rods are positioned within said hollow shaft.

14. A rotor as defined in claim 12 in which said tie rods are secured to end plates which in turn are connected to stub shafts.

15. A rotor as defined in claim 12 in which projections are carried by said hub members with openings through said projections for receiving said tie rods.

16. A horizontal rotor for introducing gases into fluids comprising:
    a. a plurality of axially arranged hub members mounted along and extending transversely of the axis of rotation of the rotor and being formed of a synthetic plastic material,
    b. a plurality of radially extending synthetic plastic agitator elements molded integrally with each said hub member to form an integral star-shaped unit,
    c. axially extending tie rods securing said hub members in place to provide a rigid unit, and
    d. ring-like members interposed between at least one pair of said hub members with openings through said ring-like members for receiving said tie rods.

* * * * *